Oct. 20, 1959     E. JEDRZYKOWSKI     2,908,994
CROP TREATING DEVICE
Filed Aug. 28, 1956     2 Sheets-Sheet 1
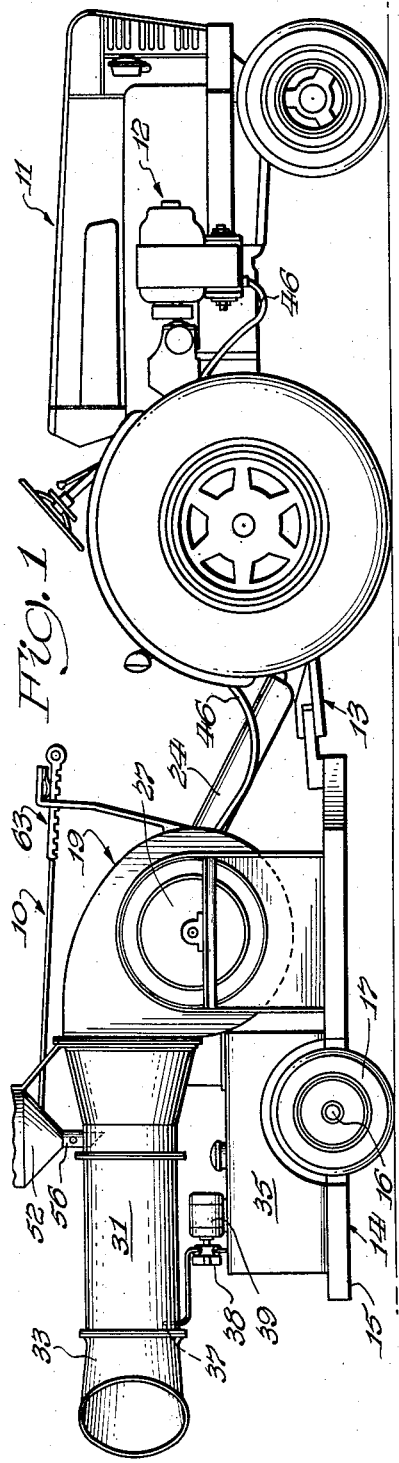
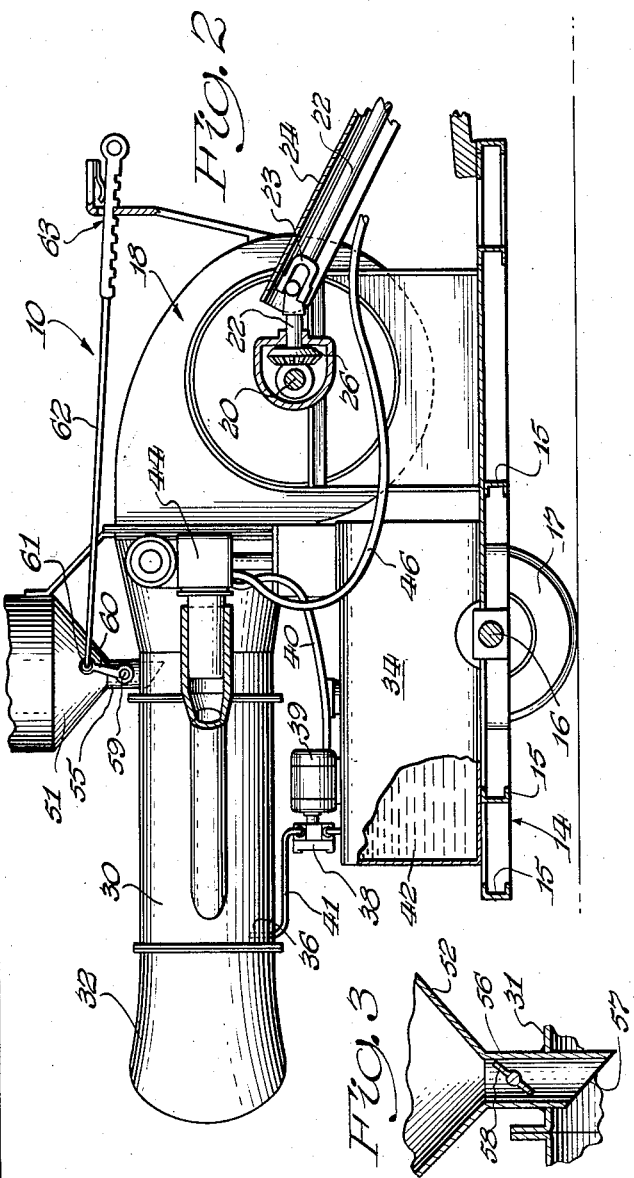
Inventor
Edmund Jedrzykowski
Paul O. Pippel
Attorney Oct. 20, 1959     E. JEDRZYKOWSKI     2,908,994
CROP TREATING DEVICE
Filed Aug. 28, 1956     2 Sheets-Sheet 2
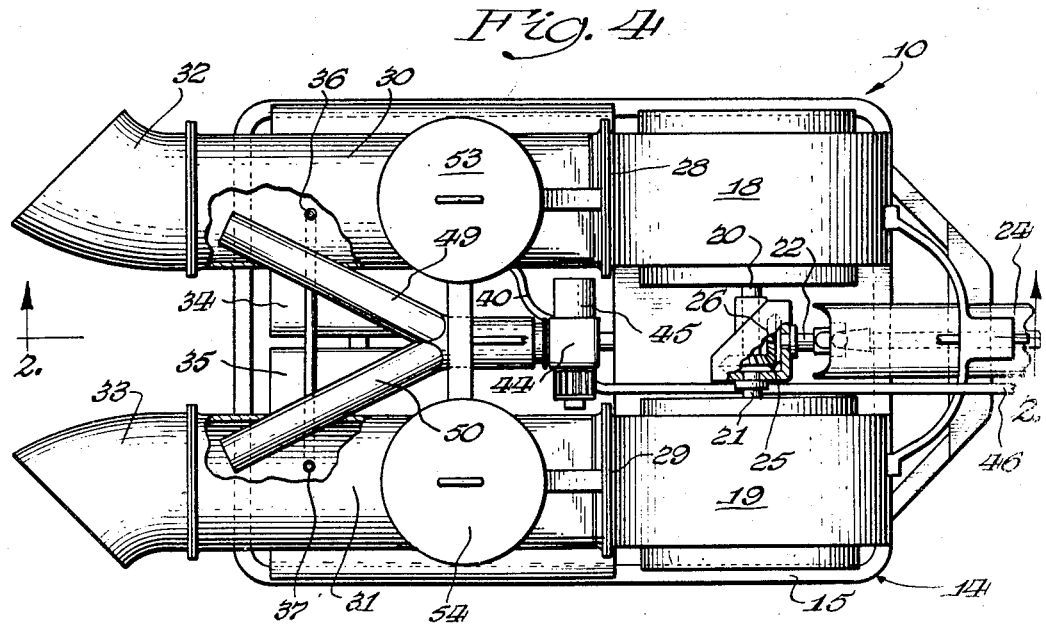
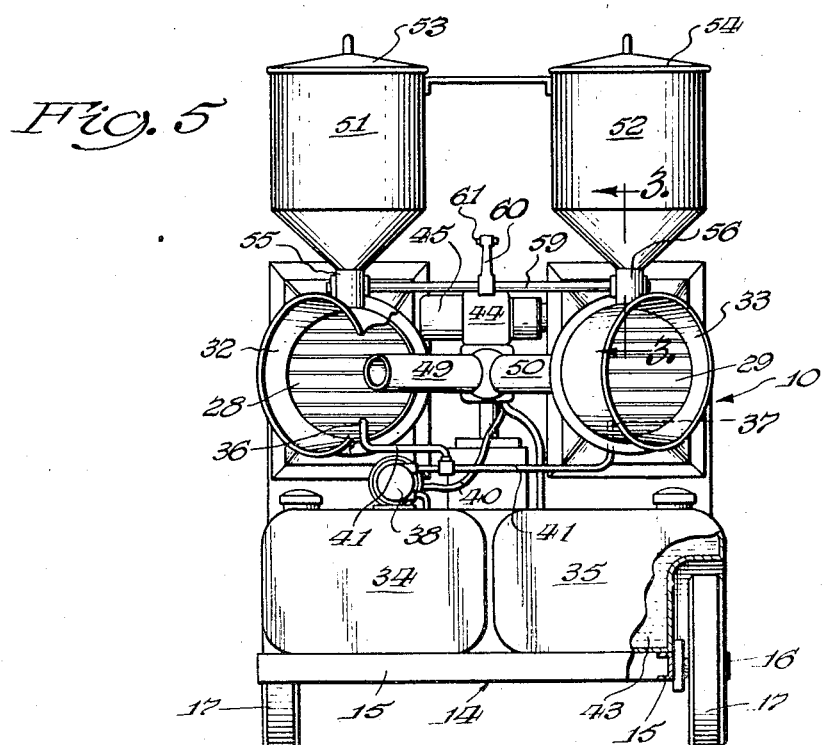
Inventor
Edmund Jedrzykowski
Paul O. Pippel
Attorney

United States Patent Office 2,908,994
Patented Oct. 20, 1959

2,908,994

CROP TREATING DEVICE

Edmund Jedrzykowski, Chicago, Ill., assignor to International Harvester Company, a corporation of New Jersey Application August 28, 1956, Serial No. 606,676

3 Claims. (Cl. 43—148)

This invention relates to a device for treating crops. More in particular this invention relates to a device for simultaneously treating crops with fertilizing or insecticidal materials and preventing frost damage by treating with moist heated air.

Most all types of crops are susceptible to damage by insects and the yield of many types of crops is often enhanced by an additional treatment of fertilizer during growth. It is also well known that frost damage can be devastating to crops particularly during the early part of the season. This invention contemplates a single mobile device adapted for preventing frost damage to crops and at the same time effectively treating the crops with fertilizers and/or insecticides in one operation. Thus the farmer's time and labor required are not only minimized but also his expense is minimized in that but a single machine is required. The invention also contemplates a device or machine which is adapted to treat crops separately or combinedly any of the above-mentioned operations with the same machine. Thus, for example, a farmer may with this invention prevent frost damage to a citrus fruit grove and, should he desire, treat the plants by dusting with a powdered insecticide or fertilizer at the same time.

Having the above in mind, it is a prime object of this invention to provide a mobile device capable of simultaneously treating crops with moist heated air and a fertilizer or insecticide in a single operation.

A further object of the invention is to provide a mobile device for preventing frost damage to crops which is also operable for dusting crops with an insecticide or fertilizer.

These and other important objects inherent in and encompassed by the invention will be more readily understood from the ensuing description, the appended claims and the annexed drawings wherein:

Figure 1 is a side elevation partly broken away showing the general view of an embodiment of this invention in combination with a tractor.

Figure 2 is a somewhat enlarged side elevation of this invention in section and partly broken away taken on line 2—2 of Figure 4.

Figure 3 is a sectional view of the valve construction of the material receptacle for controlling the rate flow of material to be dispersed to the crops and is taken on line 3—3 of Figure 5.

Figure 4 is a plan view of this invention partly in section and partly broken away illustrating the general arrangement of the various components.

Figure 5 is a rear view of the invention partly broken away showing additional details of the general arrangement of components.

With continued reference to the drawings, the numeral 10 designates generally the crop treating device of this invention while the numeral 11 indicates generally the means of locomotion such as a tractor. In the embodiment selected to illustrate the invention a source of power is provided on the tractor in the form of an electric generator generally indicated at 12 which is driven by the engine of the tractor 11. The tractor 11 is connected to the crop treating device 10 by most any of the commonly known hitching mechanisms generally indicated at 13.

The device 10 comprises a base or frame generally indicated at 14. The frame 14 may conveniently be constructed of channel beams 15 welded to form a conventional type base structure. The frame 14 is provided with a laterally extending shaft 16 suitably journaled to a pair of ground engaging elements such as wheels 17 for mobility when hitched to a tractor, as shown in Figure 1.

Adjacent the forward portion of the frame 14 is mounted one or more air blowers. In the preferred embodiment illustrated two well-known vane-type blowers, generally indicated at 18 and 19, are employed and positioned so that their respective impeller shafts 20 and 21 are coupled together for driving through bevel gears 25 and 26 from a common source of power. In the embodiment illustrated in the drawings the blowers 18 and 19 are driven from the power take-off drive associated with the tractor 11 through a driven shaft 22, as best shown in Figures 2 and 4. The driven shaft 22 may include a pair of universal joints, one of which is shown at 23, in the usual drive connection. A protective shield or guard 24 is provided for safety reasons so that injury to the operator is avoided. While one means for driving the blowers 18 and 19 is illustrated, it should be understood that the blowers may be driven by other means such as one or more electric motors energized by the generator 12 on the tractor 11.

The air intake port 27 for the blower 19 is disposed on the outer side thereof, as best shown in Figure 1. The air intake port for the blower 18, while not shown, is disposed on the outer side thereof in symmetrical relation to the port 27. The air exhaust ports 28 and 29 respectively of the blowers 18 and 19 are disposed adjacent the rearward end portion of the blowers and are adapted to exhaust the air in a rearward direction.

Each of the blowers 18 and 19 is provided respectively with longitudinally extending large sectionally constructed air ducts 30 and 31 mounted securely and communicatively connected to the exhaust ports 28 and 29 respectively, as shown in Figures 1, 2 and 4. The rearward end portions of the ducts 30 and 31 may be provided with curved sections 32 and 33 for directing the discharging air from the ducts into the atmosphere and rearwardly.

Mounted on the rearward portion of the frame 14 are two longitudinally disposed tanks 34 and 35. The tank 34 is adapted to carry water or other liquid 42 while the tank 35 is a reservoir for liquid heating fuel 43. In the rearward portion of the ducts 30 and 31 are mounted respectively liquid or fluid spray orifices or nozzles 36 and 37. On the top of the tank 35 is mounted a fluid or water pump 38 driven by an electric motor 39 powered by the generator 12 of the tractor 11 through electric wires 40. The pump 38 is adapted to draw fluid from the tank 34 and deliver the fluid so drawn to the nozzles 36 and 37 through conventional piping 41 under pressure whereby the fluid from the tank 34 is discharged in the rearward portion of the ducts 30 and 31 in spray form from the respective nozzles 36 and 37. From this it is apparent that air from the blower discharged through the open rearward ends of the curved sections 32 and 33 respectively of the ducts 30 and 31 will be charged with finely divided globules of liquid emanating from the respective nozzles 36 and 37 forming a cloud-like or fog-like mist discharged into the surrounding atmosphere.

Now in order to heat the air as it is discharged through the ducts 30 and 31 a conventional type fuel combustion or oil burner 44 is mounted therebetween, as illustrated in Figures 2, 4 and 5. The burner 44 may include a fuel pump and an actuating electric motor 45 powered by the generator 12 of the tractor 11 through a conventional connection of the electric wires 46. Oil or other fuel 43 is drawn from the reservoir 35 by the fuel pump of the burner mechanism 44 through a feed tube 48.

Each of the ducts 30 and 31 respectively is provided with junctioning small ducts 49 and 50, the rearward ends thereof extending through the walls of the large ducts 30 and 31 to form a venturi arrangement, as best shown in Figures 3, 4 and 5. For convenience the forward ends of the ducts 49 and 50 may be joined together in a Y-formation to fit over the combustion chamber of the burner 44. From this it can be seen that the venturi action of the small ducts 49 and 50 within the large ducts 30 and 31, respectively, tends to draw or aspirate hot air and perhaps the combustion products of the burner 44 at relatively high temperatures through the small ducts 49 and 50 into the large ducts 30 and 31 where the hot gases are mixed with the cold air from the blowers resulting in a moderately warmed air discharged from the rearward ends of the large ducts into the atmosphere. Of course it should be understood that other forms of heating units would also be satisfactory. For example, a gas burner using compressed fuel gas like propane or butane may be used. Also, an electric heater powered by the generator 12 might be used in which case the heating elements may be incorporated entirely within the ducts 30 and 31 thus relieving the necessity of the small ducts 49 and 50 as well as the fuel reservoir 35.

In order to provide means for dusting the crops with insecticides or fertilizers including mixtures thereof, a pair of receptacles 51 and 52 with respective covers 53 and 54 are suitably mounted on the top of each respective large air ducts 31 and 32. The lower portions of the receptacles 51 and 52 are provided with short length conduits 55 and 56 respectively which junction with the respective large ducts 30 and 31 in the manner illustrated in Figures 1, 2, 3 and 5. The lower end portions of the conduits 55 and 56 are cut at an angle, as best shown in Figures 1 and 3, to form a venturi arrangement. The velocity of the air passing through the ducts 30 and 31 creates a partial vacuum within the conduits 55 and 56.

Each of the conduits is provided with a valve, one of which is shown at 58, so that the rate of flow of material from the receptacles 51 and 52 into the ducts 30 and 31 may be controlled. A laterally extending rod 59 connecting the valve 58 in each of the conduits 55 and 56 is provided with a rock arm 60 which is pivotally connected at the outer end thereof at 61 to a control lever 62. The lever 62 extends forwardly toward the rearward part of the tractor 11 so that the operator may control the rate of flow of the material through the conduits 55 and 56 from his operating station on the tractor. The control lever 62 may be provided with any conventional detent mechanism, generally indicated at 63, for maintaining the lever 62 in a predetermined fixed position. It should be understood, however, the material charged into the receptacles 51 and 52 may not necessarily be in powdered form but may also be in liquid form as well. The dust or powdered form is more preferable and when the powder is of a type that tends to pack it may be necessary to provide the receptacles with conventional vibrators or shakers (not shown).

*Operation*

Assuming first that an atmospheric temperature drop occurs whereby the selected crop, such as a citrus fruit grove, is in danger of frost. These temperature drops usually occur during clear or cloudless nights with little or no wind. The farmer fills the tank 34 with water and the reservoir 35 with liquid fuel such as oil. He then charges the receptacles 51 and 52 with insecticidal or fertilizer material with the valves 58 in closed position. The source of power, namely the tractor, is then started so that the generator 12 is in operation. The electric motor 45 of the oil burner 44 is then energized and the oil ignited in any conventional manner. As soon as the burner 44 is in operation the power take-off mechanism of the tractor 11 is engaged in a well-known manner which in turn drives the impellers of the blowers 18 and 19 in a direction for driving air through the large ducts 30 and 31 rearwardly. The aspiration of hot gases through the small ducts 49 and 50 from the burner 44 are caused to mix with the cold air from the blowers, resulting in a warm mixture. The electric motor 39 is then energized from the generator 12 which drives the water pump 38 in a direction to draw water from the tank 34 and deliver the fluid to the spray nozzles 36 and 37. The warm air mixture encounters the water spray causing a portion of the water to enter the gas phase thereby absorbing heat (latent heat of vaporization) while the balance of liquid water is discharged in very small droplets. The mixture of warm humid air and small droplets of liquid moisture is discharged into the atmosphere through the open ends of the curved sections 32 and 33 forming a warm moisture laden fog which is dense and tends to lay like a thick blanket in the air. The dense low-hanging fog reacts as a heat insulator preventing the sub-freezing upper air layer from reaching the crop and thus prevents frost damage. Furthermore, as the heat from the fog blanket slowly dissipates the moisture in the gas phase progressively condenses at which time it gives up its latent heat of vaporization thus providing a continuity of heat evolution. Thus the rate of temperature drop of the fog blanket is greatly retarded. The mobility of the device as drawn by the tractor, of course, serves to spread this warm dense fog over a large area.

Now to further increase the density of the fog blanket as above described, the material in the receptacles 51 and 52 is gradually discharged to the atmosphere along with the warmed air by opening the valves 58 through the control lever 62 permitting the material to mix with the warmed moist air. The dust or material from the receptacles gradually adheres to all parts of the crop and adjacent ground resulting in a much desired uniform dispersement of material particles.

Having thus described an embodiment of the invention, it can now be seen that the objects of the invention have been fully achieved and it must be understood that changes and modifications may be made which do not depart from the spirit of the invention nor from the scope thereof as defined in the appended claims.

What is claimed is:

1. A tractor propelled mobile crop treating device comprising in combination an ambulatory frame, an air blower mounted on the forward end portion of said frame, said air blower having an air intake port and an air exhaust port, a first air duct mounted longitudinally on said frame, the forward end of said air duct being communicatively connected to said exhaust port of said blower and the rearward end of said duct being open to the atmosphere, said air intake port of said blower being positioned substantially in the same horizontal plane as said first air duct, a water tank mounted on said frame, a water pump having an inlet port and an outlet port supported by said frame, said inlet port of said pump being communicatively connected to said tank, a fluid vaporizing spray nozzle mounted internally in the rearward portion of said first air duct and communicatively connected to the outlet port of said pump, said pump being operable to move water from said tank into said nozzle for discharge into said first air duct in spray form, a liquid fuel reservoir mounted on said frame, a liquid fuel combustion burner supported by said frame, a fuel pump mounted adjacent to said burner, said fuel pump being communicatively connected to transfer fuel from said reservoir to said burner, a second duct supported by said frame, the forward end of said second duct being communicatively connected to said burner in relation to receive heat and products of combustion from said burner, the rearward end portion of said second duct being connected communicatively with the rearward end portion of said first duct to form a horizontally disposed venturi positioned rearwardly of said spray nozzle whereby said heat and products of combustion from said burner are discharged into said first duct, a material containing receptacle mounted above and adjacent the forward end of said first duct and rearward of said blower, a conduit communicatively connecting the lower portion of said receptacle with said first duct, a valve disposed in said conduit, said valve being positioned to control adjustably the rate of discharge of material from said receptacle into said first duct, an externally operable control lever supported by said frame and positioned in connected relation for adjusting said valve, and a source of power mounted on said tractor and connectable to energize said blower and pumps for discharging a mixture of moist heated air with material from the rearward end of said first duct into the atmosphere for contacting and treating said crop.

2. A tractor propelled mobile crop treating device comprising in combination an ambulatory frame, an air blower mounted on one end portion of said frame, said air blower having an air intake port and an air exhaust port, a first air duct mounted horizontally on said frame, one end of said air duct being communicatively connected to said exhaust port of said blower and the other end being open to the atmosphere, said air intake port of said blower being positioned substantially in the same horizontal plane as said first air duct, a water tank mounted on said frame, a water pump having an inlet port and an outlet port supported by said frame, said inlet port of said pump being communicatively connected to said tank, a vaporizing fluid spray nozzle mounted internally in the other end portion of said first air duct and communicatively connected to the outlet port of said pump, said pump being operable to move water from said tank into said nozzle for discharge into said first air duct in spray form, a fluid fuel reservoir mounted on said frame, a fluid fuel combustion burner supported by said frame, a fluid fuel transferring means supported by said frame adapted to transfer fluid fuel from said reservoir to said burner, a horizontally disposed second air duct supported by said frame, said second air duct being positioned in substantially the same horizontal plane as said first air duct, one end of said second air duct being communicatively connected to said burner for receiving heat therefrom, the other end portion of said second air duct being communicatively connected with the other end portion of said first duct to form a horizontally disposed venturi for discharging heat from said burner and second duct into said first duct, said spray nozzle being positioned in said first duct between said venturi and said air blower, a material containing receptacle mounted above and adjacent one end of said first air duct, a conduit communicatively connecting the lower portion of said receptacle with said first air duct positioned between said spray nozzle and said air blower, a valve disposed in said conduit, said valve being positioned to control adjustably the rate of discharge of material from said receptacle into said first duct, an externally operable control lever supported by said frame and positioned in connected relation for adjusting said valve, and a source of power mounted on said tractor and connectable to energize said blower and pumps for discharging a mixture of moist heated air with material from the other end of said first duct into the atmosphere for contacting and treating said crop.

3. A tractor propelled mobile crop treating device comprising in combination an ambulatory frame, an air blower mounted on one end portion of said frame, said air blower having an air intake port and an air exhaust port, an air duct mounted longitudinally on said frame, one end of said air duct being communicatively connected to said exhaust port of said blower and the other end being open to the atmosphere, said air intake port being positioned substantially in the same horizontal plane as said air duct, a material containing receptacle mounted above and adjacent one end of said duct, a conduit communicatively connecting said receptacle with said duct, a valve disposed in said conduit, said valve being positioned to control adjustably the rate of discharge of material from said receptacle into said duct, air heating means supported by said frame and communicatively connected for introducing heat continuously into the other end portion of said duct, a fluid spray nozzle mounted in said duct, said nozzle being positioned intermediate said other end portion of said duct and said conduit, a source of water under pressure mounted on said frame, said source of water being connected to said nozzle for discharging vaporized water into said duct, and a source of power mounted on said device and connectable to energize said blower and heating means whereby a mixture of moist heated air with said material is discharged from said other end of said duct into the atmosphere for contacting and treating said crop.

References Cited in the file of this patent

UNITED STATES PATENTS

| | | |
|---|---|---|
| 1,372,793 | Andersson | Mar. 29, 1921 |
| 1,495,098 | Nelson | May 20, 1924 |
| 2,201,995 | Erickson | May 28, 1940 |
| 2,315,096 | Sanderson | Mar. 30, 1943 |
| 2,593,275 | Daugherty | Apr. 15, 1952 |
| 2,768,859 | Patterson | Oct. 30, 1956 |